United States Patent [19]
Kneller et al.

[11] Patent Number: 5,266,243
[45] Date of Patent: Nov. 30, 1993

[54] METHOD FOR PREPARING A CERAMIC OXIDE MATERIAL

[76] Inventors: James F. Kneller, 925 Beach Ave., La Grange Park, Ill. 60525; David R. Cosper, 6824 Valley View Dr., Downers Grove, Ill. 60516

[21] Appl. No.: 914,806

[22] Filed: Jul. 16, 1992

[51] Int. Cl.$^5$ .......................... B29B 9/00; C04B 35/64
[52] U.S. Cl. ......................................... 264/6; 264/12; 264/63
[58] Field of Search ............................. 264/6, 12, 63; 525/327.8, 330.2

[56] References Cited

U.S. PATENT DOCUMENTS

| | | | |
|---|---|---|---|
| 3,998,917 | 12/1976 | Adelman | 264/63 |
| 4,496,506 | 1/1985 | Sakato | 264/63 |
| 4,966,742 | 10/1990 | Khoury | 264/63 |
| 4,968,460 | 11/1990 | Thompson et al. | 264/6 |

OTHER PUBLICATIONS

Cesarano, J.; Aksay, I. A.; Bleier, A. "Stability of Aqueous $\alpha Al_2O_3$ Suspensions With Poly(Methacrylic Acid) Polyelectrolyte", J.Am.Ceram.Soc. 1988, 71(4), 250-255.
Cesarano, J.; Aksay, I. A. "Processing Concentrated Aqueous αAlumina Suspensions Stabilized With Polyelectrolytes", J.Am.Ceram.Soc. 1988, 71(12), 1062-1067.
Kelso, J. F.; Ferrazzoli, T. A. "Effect of Powder Surface Chemistry on the Stability of Concentrated Aqueous Dispersions of Alumina", J.Am.Ceram.Soc. 1989 72(4), 625-627.
Lukasiewicz, S. J., J.Am.Ceram.Soc. 1989, 72(4), 617-624. "Spray Drying Ceramic Powders".
Sacks, M. D., et al., Adv.Ceram. 1987, 21, 495-515. "Dispersion and Rheology in Ceramic Processing".
English Language Abstract of Japanese Kokai Patent JP 01236931 A2, by Ishikawa et al., dated Sep. 21, 1989.
English Language Abstract of Japanese Kokai Patent JP 63258910 A2, by Shimada et al., dated Oct. 26, 1988.
English Language Abstract of Japanese Kokai Patent JP 62209176 A2, by Shimada et al., dated Sep. 14, 1987.
English Language Abstract of Japanese Kokai Patent JP 62258732 A2, by Shimada et al., dated Nov. 11, 1987.
English Language Abstract of Japanese Kokai Patent JP 62072762 A2, by Shimada et al., dated Sep. 26, 1985.
English Language Abstract of Japanese Kokai Patent JP 62312730 A2, by Kawame et al., dated Jun. 16, 1987.
Technical Document Entitled "Tamol ® 731 Dispersant Tamol 850 Dispersant," Marked CS-73 and dated Feb. 1984.
Technical Document entitled "Tamol ® Aqueous Dispersants," dated 1988.

*Primary Examiner*—James Derrington
*Attorney, Agent, or Firm*—Dressler Goldsmith Shore Sutker & Milnamow, Ltd.

[57] ABSTRACT

The invention provides an improved method for preparing fired ceramic oxide material. A ceramic oxide powder is dispersed in an aqueous solution containing a dispersant having as an active ingredient a dissolved salt of an anionic polymer formed from maleic acid, maleic acid anhydride, or fumaric acid. The slurry containing the dispersed ceramic oxide powder is spray-dried, compressed while substantially dry, and heated to produce a fired ceramic material. Ceramic materials having relatively higher density and strength can be produced by the method.

4 Claims, 5 Drawing Sheets

FIG. 5

METHOD FOR PREPARING A CERAMIC OXIDE MATERIAL

TECHNICAL FIELD OF THE INVENTION

This invention relates to a method for preparing a ceramic oxide material which utilizes a dispersant.

BACKGROUND OF THE INVENTION

Dispersants have several functions in producing ceramic materials via a method which includes spray drying and dry compressing. One function is to reduce the tendency of particles in the slurry to settle and stabilize the slurry. Another function is to facilitate maximization of the concentration of solids in the slurry before spray drying in order to reduce the energy required in the drying process. A third function is to reduce the viscosity of the slurry so that the slurry may be more easily pumped. A fourth function is to enhance green strength of a compressed ceramic aggregate structure formed from the spray dried particles. In performing these functions, dispersants affect the morphology and composition of the spray dried particles, which in turn govern the properties of the green and fired ceramics which are ultimately produced.

Ceramic oxide materials are conventionally produced from powdered ceramic oxides such as magnesia, alumina, and zirconia. On a commercial scale, the powdered oxides are usually mixed in a slurry along with additives, such as dispersants and binders, and spray dried. The dried particles are commonly compressed into an aggregate structure having a desired shape, usually by means of a hydraulic press. The aggregate structures are subsequently heated to sinter the individual particles into a cohesive mass which may approximate a monolithic ceramic phase.

In the past, ceramic manufacturers have relied on dispersants such as lignosulfonates, polyacrylates, and poly(methacrylates). However, a need still exists for a method utilizing an improved dispersant for use in preparing ceramic oxide materials.

SUMMARY OF THE INVENTION

The invention is a method for preparing a ceramic oxide material by a spray drying and dry pressing procedure which utilizes a dispersant. It has been discovered that a dispersant comprising a dissolved salt of an anionic polymer of maleic anhydride, maleic acid, or fumaric acid stabilizes and reduces the viscosity of an aqueous slurry of ceramic oxide particles. The dispersant also improves the green strength of an aggregate structure formed from a spray dried and compressed slurry. A fired ceramic material produced by heating the aggregate structure so formed exhibits relatively higher density and greater strength than conventional ceramic materials.

DETAILED DESCRIPTION OF THE PREFERRED EMBODIMENTS

The method for preparing a ceramic oxide material in accordance with the present invention involves mixing a slurry that includes a ceramic oxide powder and a dissolved salt which acts as a dispersant, spray drying the slurry, compressing spray dried particles to form an aggregate structure, and heating the aggregate structure to produce a fired ceramic material. The ceramic oxide powder is composed of particles which generally have an effective diameter in the range of about 0.5 to about 10 $\mu$m. The particles may be formed of any ceramic oxide, with alumina and zirconia being preferred. A slurry is defined as a suspension of a solid in a liquid which is sufficiently high in stability and low in viscosity to be capable of practical transport by ordinary centrifugal pumps.

The solution from which the slurry is prepared may contain any type of water, but deionized water is preferred for producing technical grade ceramic materials. Similarly, although the slurry produced by mixing the water, the ceramic oxide powder, and the salt of the anionic polymer and other additives may be spray dried without further treatment, it is preferred that the particles of the slurry be deaggregated before spray drying. The particles may be deaggregated by rolling them in a tumbling mill, such as a ball mill, pebble mill, rod mill, or tube mill. Such milling usually produces a significant reduction in the viscosity of the slurry. Tumbling the slurry in a ball mill for a period of about 3 hours has produced good results.

It is preferred that a salt of an anionic polymer be added to the aqueous solution before the ceramic oxide powder is added, although addition in any order is satisfactory. Preferably, the slurry includes in the range of from about 0.01% to about 5% of the salt, based upon the total weight of the ceramic oxide powder present in the slurry. The powder is added with stirring until the slurry includes in the range of about 40% to about 60% by volume of ceramic oxide particles, based upon the total volume of the slurry.

Higher concentrations of particulates in the slurry require less energy during the subsequent spray drying step and, generally, produce preferred larger granules. However, slurries having relatively higher proportions of ceramic particles are prone to forming particle agglomerates which resist dispersion. Therefore, it is recommended that stirring of the liquid and addition of the dispersant are commenced before the ceramic oxide powder is introduced.

Spray drying is an evaporative process in which almost all liquid is removed from a slurry containing a liquid and a non-volatile solid. The liquid is dried by direct contact with a drying medium, usually air, in an extremely short retention time, on the order of about 3 to about 30 seconds. The primary controlling factors in a spray drying process are particle size, particle distribution, particle shape, slurry density, slurry viscosity, temperature, residence time, and product moisture.

The viscosity of the slurry must be suitable for handling and spray drying. Although spray drying equipment conditions may be adjusted to handle a variety of viscosities, larger particles will usually result from higher viscosity slurries. If the resultant particles are too large, they may yield weak green bodies because of the relatively large interstices which exist between such particles.

Those of ordinary skill in the art are familiar with the spray drying process as applied to the production of ceramic oxide materials and will be able to optimize the control factors of spray drying to best advantage. Alternatively, when the ceramic oxide material is to be produced on a relatively small scale, the spray drying process may be replaced by other well known drying methods, such as batch calcination followed by granulation.

In addition to the dissolved salt of the anionic polymer, the slurry contains a binder and perhaps an antifoaming agent or other additives. The slurry must contain a binder which provides lubricity during subsequent compression of the particles, and also provides adhesion so that the "green," unfired, body of compressed particles holds together. Upon firing and the onset of sintering, the binder is no longer required. Ideally, the dispersant and binder will combust completely during the early stages of the firing process so as to leave no residue which might adversely affect sintering.

Spray drying of the slurry, also called "slip," produces substantially dry, free-flowing powder particles which contain the anionic polymer, the binder and other materials, such as sintering aids. The dry particles are granules which are generally spherical in shape and have an effective diameter of about 50 to about 200 micrometers. Typically, about 2% to about 8% binder, based on the dry weight of the powder, is present in the dry particles.

The dry particles are compressed to produce an aggregate structure. Compression is accomplished in dies having an internal volume which approximates the shape desired for the final fired ceramic product. The spray dried blend of powder, binder, and dispersant must be free flowing so that it can completely fill the compressing dies. As noted above, lubricants such as polyethylene oxides and fatty acid derivatives promote lubrication during the compressing step.

Inside the dies, the dry particles are subjected to a pressure which is typically in the range of about 5000 to about 25000 psi. Compressing the particles produces an aggregate structure which retains its shape after removal from the die.

Heating the aggregate structure drives off volatile materials such as water, and burns off organic materials, such as binders or dispersants. At higher temperatures, phase transitions occur within the particles that can improve the properties of the final ceramic product. When a sufficiently high temperature is reached, the particles of the aggregate structure begin to fuse, but do not fuse completely, and become fastened to one another to produce a relatively strong fired ceramic material having the desired shape.

The dispersant in accordance with the present invention includes a dissolved salt of an anionic polymer. The cation of the polymer may be, for example, sodium, potassium, ammonium, or lithium. The anionic polymer is produced from a polymer that has been condensed from a monomer mixture which contains at least one monomer selected from the group consisting of maleic acid, maleic acid anhydride, and fumaric acid. Here, a copolymer is a polymer formed from two, three, four, or more distinguishable monomers.

Other monomers which may be present in the monomer mixture and take place in the polymerization reaction are vinyl compounds, such as vinyl acetate or alkyl vinyl ethers. Alternatively, the anionic polymer can be a copolymer of maleic acid and an olefin, such as diisobutylene. As another alternative, maleic anhydride may be copolymerized with styrene and, subsequently, sulfonated to produce the anionic polymer.

Preferably, the polymerization product has been neutralized and hydrolyzed, as by contact with an aqueous metal hydroxide solution, and is anionic and soluble in water.

The dissolved salt can be a terpolymer, being the condensation product of three distinguishable monomers. Excellent dispersion has been achieved using a hydrolyzed terpolymer of maleic anhydride, N-vinylpyrrolidinone, and a vinyl compound selected from the group consisting of acrylic acid, acrylamide, methyl methacrylate, and butylvinyl ether.

Although the dispersant in accordance with the present invention may be prepared by any suitable means, the following method for preparing the dispersant is recommended. A mixture of monomers is combined with an organic solvent, such as toluene. At least one of the monomers is selected from the group consisting of maleic acid, maleic acid anhydride, and fumaric acid. Another monomer in the mixture is a vinyl compound selected from the group consisting of vinyl acetate, vinyl ethers, acrylic acid, acrylamides, and methyl methacrylate. The mixture is brought to reaction conditions, typically at a temperature in the range of about 50° to about 80° C. and a pressure of one atmosphere. It is preferred that an inert gas, such as nitrogen, is bubbled through the monomer mixture during the time in which the mixture is at or near reaction conditions in order to minimize undesirable side reactions involving oxygen. The reaction mixture should be stirred continuously while at reaction conditions.

An initiator is added to the mixture to initiate or accelerate a polymerization reaction that produces a polymeric intermediate product. The initiator is a free radical initiator, such as a peroxide or a peroxyester. A preferred initiator is the peroxyester t-butyl peroctoate. The initiator may be added all at once or over a period of time to mitigate the exothermic reaction which it stimulates. Typically, the weight of the initiator is approximately 5% of the weight of the monomers, exclusive of the organic solvent. It is usually convenient to dilute the initiator with the organic solvent before adding it to the monomer mixture.

The monomer mixture may also include a chain transfer agent, such as thioglycolic acid, which serves to limit the molecular weight of the resulting polymer. Inclusion of the chain transfer agent is especially preferred when the anionic polymer is a copolymer of maleic anhydride and vinyl acetate.

The organic solvent is usually present in an amount by weight that is approximately five times the weight of the monomers in the monomer mixture. The addition reaction typically takes in the range of about 4 to about 8 hours to reach completion, as evidenced by a subsidence in the generation of heat and the appearance of a separate phase which contains the intermediate product.

The intermediate product is removed from the mixture for further processing. Separation may be conveniently accomplished by cooling and filtering the mixture. The intermediate product is retained on the filter and, preferably, washed with the organic solvent, air-dried, and dried under vacuum.

The intermediate product is converted to the anionic polymer by heating in contact with an aqueous hydroxide solution. The hydroxide solution contains ammonium hydroxide or an alkali metal hydroxide in an amount sufficient and under conditions effective to neutralize, most preferably, more than about three quarters and, ideally, substantially all carboxylic acid groups that may be present in the intermediate product. The effect of neutralization, also called hydrolysis, is to convert the group into a carboxylate. Esters may be converted to alcohols by the same process.

Generally, this hydrolysis is accomplished by suspending the intermediate product in water, preferably deionized water, and adding sufficient sodium hydroxide solution to bring the solution to a pH in the range of about 6 to 9. In extreme cases, such as conversion of the intermediate product which is a copolymer of maleic anhydride and vinyl acetate, it may be necessary to raise the temperature of the solution to about 98° C. for several hours to achieve complete hydrolysis. The desired anionic polymer is then present as a polymeric carboxylate dissolved salt. The dispersant may be utilized immediately in the aqueous solution form or reduced to solid form and dissolved again at a later time, as convenient.

The reaction mixture contains at least one monomer selected from the group consisting of maleic acid, maleic acid anhydride, and fumaric acid. Of these, monomers containing maleic acid or maleic acid anhydride are preferred. The mixture additionally contains a monomer which is a vinyl compound selected from the group consisting of vinyl acetate, vinyl ethers, acrylic acid, acrylamides, and methyl methacrylate. Monomer mixtures containing maleic anhydride and the vinyl compound in approximately equimolar amounts are especially preferred.

Monomer mixtures containing three monomers capable of participating in the addition reaction also produce good results. Especially preferred is the mixture in which maleic acid or maleic acid anhydride, the vinyl compound, and N-vinylpyrrolidinone are present in the molar proportions of approximately 2:1:2.

The following examples are presented as a means of further communicating the invention.

EXAMPLE 1

To 327 grams of toluene, 22.7 grams of maleic anhydride, 25.7 grams of N-vinylpyrrolidinone, and 11.6 grams of methyl methacrylate were added to make a reaction mixture containing 15 weight percent of monomers. The reaction mixture was heated to approximately 80° C. while nitrogen was bubbled through the mixture at the rate of 250 cubic centimeters per minute. Tertiary-butyl peroctoate in the amount of 3.0 grams was dissolved in 10 grams of toluene and added in one batch to the reaction mixture. Thereafter, conditions were held substantially constant for a period of 5 hours. During that time, a tan-colored polymer was created as a suspension in the reaction mixture.

The polymer was separated by filtration, washed with toluene, and dried under vacuum overnight at 50° C. Then, sufficient deionized water and 30% aqueous ammonia hydroxide solution was added to a portion of the polymer to produce a 5 weight percent aqueous solution of dissolved anionic polymer salt. The 5% solution so produced was designated sample A.

EXAMPLE 2

24.0 grams of maleic anhydride, 27.2 grams of N-vinylpyrrolidinone, and 8.7 grams of acrylamide were dissolved in 327 grams of toluene. A nitrogen purge was bubbled through the solution, and the solution was heated to about 82°. An initiator consisting of 3.0 grams of t-butyl peroctoate dissolved in 10 grams of toluene was added to the solution. Reaction conditions were maintained for approximately 4½ hours, during which time the formation of a thick slurry of polymer was observed.

Subsequently, the solution was cooled to room temperature. The polymer was separated by filtration, washed with toluene, air-dried, and dried in a vacuum for 24 hours at 55°. Laboratory analysis showed the dried polymer to have a molecular weight of 11,100.

Sufficient aqueous ammonium hydroxide and deionized water was added to a portion of the dried polymer to produce a 5 weight percent solution of the ammonium salt of the polymer. The solution was designated sample B.

EXAMPLE 3

The procedure of Example 2 was modified for Example 3 in that the reaction mixture contained a chain transfer agent, thioglycolic acid. Also, some of the components were added over a period of time rather than all at once. One gram mole of maleic anhydride, 98.0 grams, was added to 350 milliliters of toluene, and the resulting solution was heated to a temperature of 70° C. while purging with nitrogen at the rate of 500 cubic centimeters per minute. Half of the initiator, 3 grams of t-butyl peroctoate in 70 milliliters of toluene, was added all at once. The balance of the initiator, an additional 3 grams of t-butyl peroctoate in 70 milliliters of toluene, was added over a period of about 2½ hours using a constant rate addition funnel.

About 1 minute after the first half of the initiator was added, constant rate addition of a solution containing 86 grams of vinyl acetate and 20 grams of thioglycolic acid was started and continued over a period of about 2½ hours.

Reaction conditions were maintained as described in Example 2 with stirring and nitrogen purge for a period of about 8 hours during which time a thick slurry of polymer was created. The slurry was cooled to room temperature and the polymer was separated by filtration, washed with fresh toluene, and dried first in air and then in a vacuum at 50° C.

A portion of the dried polymer was mixed with 30 weight percent aqueous ammonium hydroxide solution and sufficient deionized water to produce a solution containing 5% by weight of the ammonium salt of the polymer. The solution was designated sample C.

EXAMPLE 4

Using substantially the same procedure as described in Example 2 above, 22.7 grams of maleic is anhydride, 25.7 grams of N-vinylpyrrolidinone, and 11.6 grams of butyl vinyl ether were dissolved in 327 grams of toluene to produce a reaction mixture. The mixture was reacted at 82° C. with nitrogen purging and stirring for a period of about 5½ hours after addition of an initiator, 3.0 grams of t-butyl peroctoate and 10 grams of toluene.

After filtering and drying, the polymer exhibited a molecular weight of 39,100. A 5 weight percent sample of a dissolved ammonium salt of the polymer at 9 pH was prepared and designated sample D.

EXAMPLE 5

A control dispersant containing poly(acrylic acid) as an ammonium salt was prepared by adding 100 grams of deionized water and 40.7 grams of 26.3 weight percent aqueous ammonium hydroxide solution to a commercially obtained 65 weight percent solution of aqueous polyacrylic acid. The ammonium hydroxide solution was added dropwise with cooling: The resulting solution contained 30.8 weight percent of dissolved ammonium polyacrylate salt. The solution was designated sample E.

EXAMPLE 6

A solution of poly(methacrylic acid) as an ammonium salt was obtained commercially under the trade name Darvan C ™. The commercially obtained solution received no further treatment except for dilution with deionized water, as necessary. The solution was designated sample F.

EXAMPLE 7 using substantially the same procedure as Example 2, but delaying the addition of a third monomer to the reaction mixture until reaction conditions had been attained, a terpolymer was prepared and hydrolyzed. Maleic anhydride in the amount of 24.0 grams and 27.2 grams of N-vinylpyrrolidinone were added to 327 grams of toluene. The mixture was heated to 82° C. with stirring and nitrogen purging, and then 8.8 grams of acrylic acid were introduced to the mixture. Over a period of about 3 hours, a thick, white slurry of polymer was formed. This mixture was cooled and the polymer was filtered, washed, and dried. The dried polymer had a molecular weight of about 17,400.

A portion of the dried polymer was mixed with sufficient aqueous ammonium hydroxide solution and deionized water to produce a 5 weight percent solution of an ammonium salt of the polymer with a pH of 9. The solution containing the dissolved salt was designated sample G.

EXAMPLE 8

A second portion of the dried polymer produced in the experiment described in Example 3 above was treated to produce a sodium salt. The dried polymer in an amount of 40 grams was immersed in 250 grams of water and heated to 56° C. About 38.4 grams of 50 weight percent sodium hydroxide was added to the mixture over a period of about 30 minutes, raising the pH of the mixture from about 5 to about 13. Thereafter, the mixture was heated to about 98° C. for a period of more than an hour in order to promote hydrolysis of acetate groups in the polymer. The pH of the mixture gradually declined to about 9, as indicated by pH paper. Concentration of the solution was an estimated 10.6 weight percent, based on formula weight of 160 for the acid form of the copolymer. The solution was designated sample H.

EXAMPLE 9

Slurries having 40 volume percent of alumina particles in deionized water and various dosages of the dispersants prepared in Examples 1 and 5 through 8 above were prepared and their viscosities were measured. The alumina (Alcoa A152SG) was dispersed in water with the dispersant. Then the sample was ball-milled for three hours, after which the viscosity of the slurry was measured at room temperature using a Brookfield viscometer. The viscosities of the slurries as measured in centipoise are presented as functions of the dose of the active ingredient of each dispersant, in FIG. 1.

Figure 1:
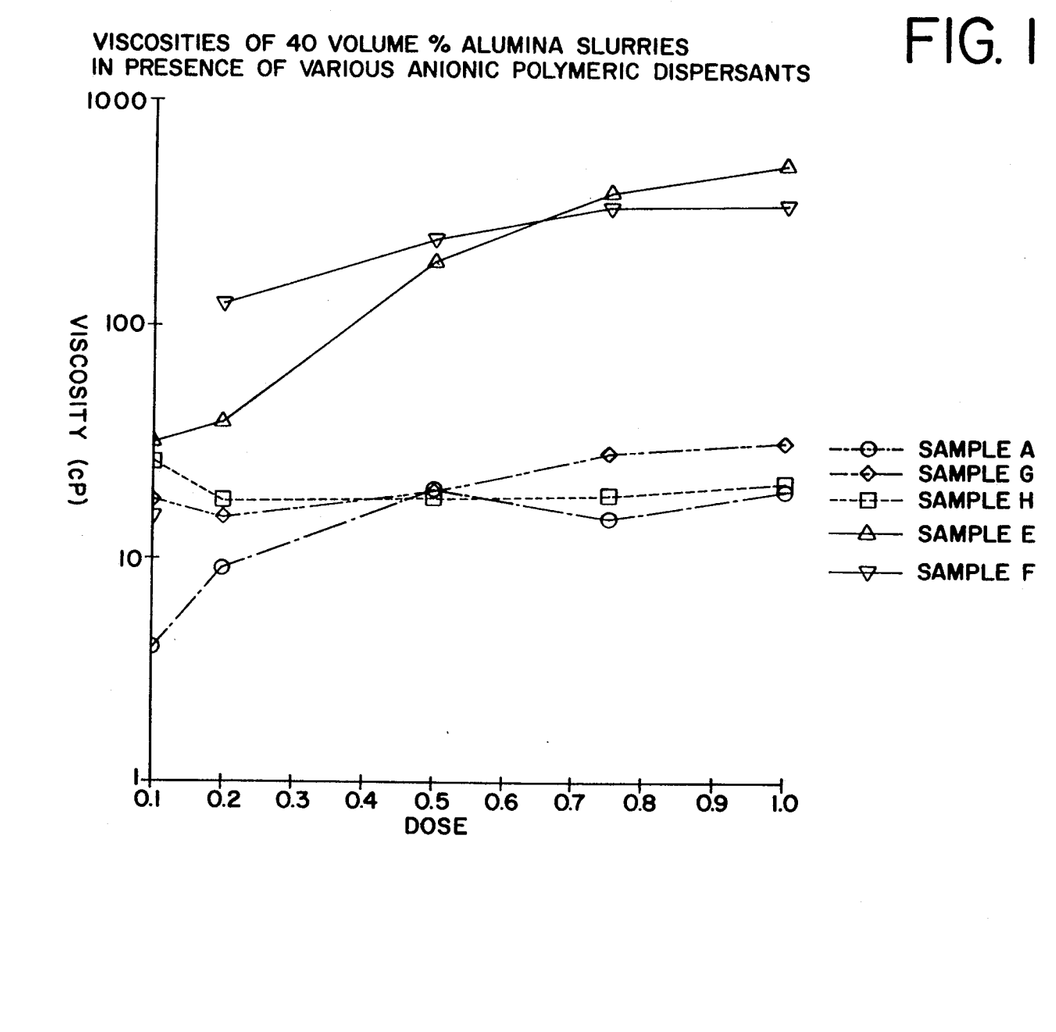
FIG. 1 is a graph which shows the relationship between the viscosities of 40 volume percent alumina slurries and the dosage of various anionic polymeric dispersants.

Inspection of FIG. 1 reveals that samples A, G and H produced slurries having lower viscosity than those produced by the conventional dispersants, samples E and F, at all dosages tested between 0.1 and 1.0 weight percent. More specifically, FIG. 1 demonstrates that the dissolved salts of anionic maleic anhydride polymers are effective dispersants for relatively concentrated aqueous alumina slurries.

EXAMPLE 10

The procedures described in Example 9 were applied to prepare 50 volume percent aqueous alumina (Alcoa A152SG) slurries containing various dosages of the dispersants prepared in Examples 1 through 5 above. Again, viscosity measurements of the slurries were made after the slurries had been ball-milled for a period of 3 hours. The viscosity measurements are graphed as a function of dispersant dosage in FIG. 2.

Figure 2:
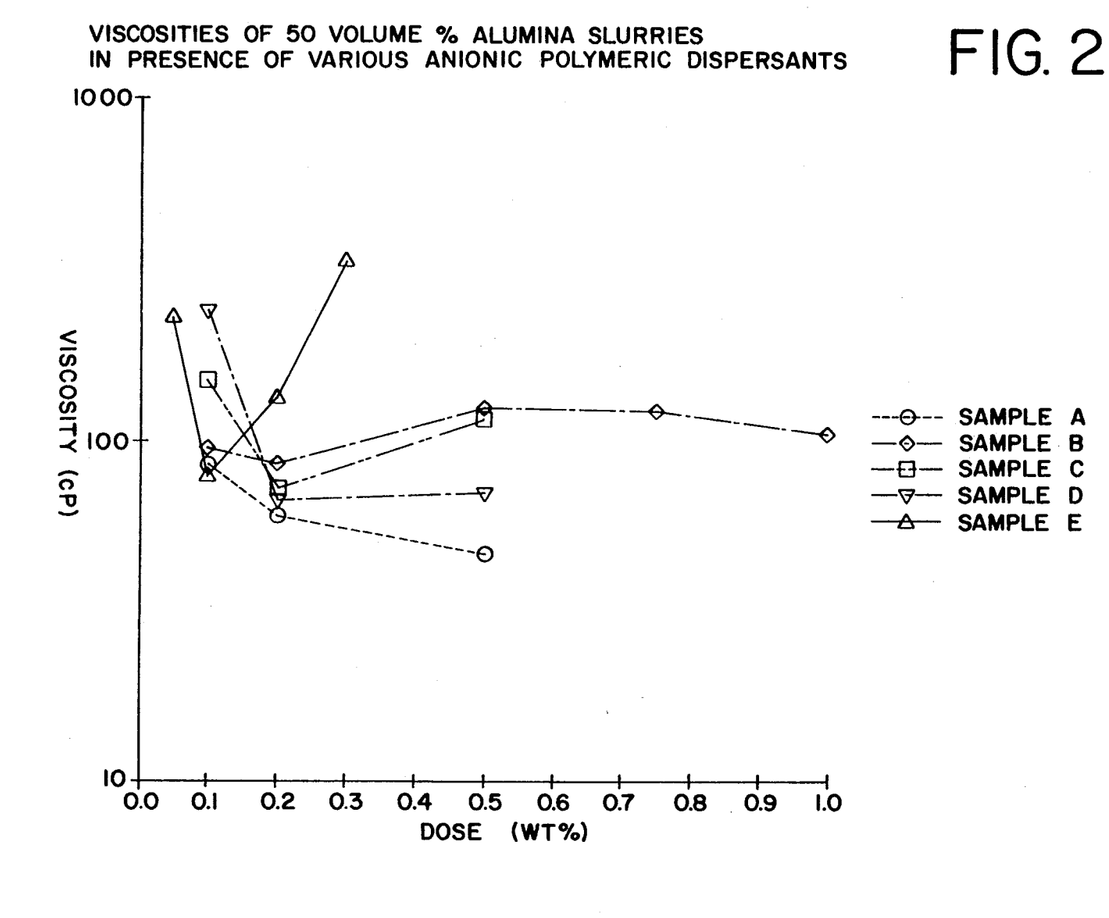
FIG. 2 is a graph which illustrates the viscosities of 50 volume percent alumina slurries as functions of the dosage of various anionic polymeric dispersants.

Referring now to FIG. 2, sample E is a control sample having the ammonium salt of polyacrylic acid as the dispersant. In comparison to sample E, samples A through D which contain the dissolved salts of maleic anhydride polymers as dispersants, provide significant reductions in the viscosity of the slurries. In addition, the viscosities provided by Samples A through D are remarkably insensitive to dose.

EXAMPLE 11

Two commercially available compounds which included maleic anhydride copolymers were diluted with deionized water to produce samples I and J. The samples contained as their active ingredient a sodium salt of a copolymer of maleic anhydride and diisobutylene, and an ammonium salt of a copolymer of maleic anhydride and diisobutylene, respectively.

Samples I and J were added to 40 volume percent aqueous alumina (Alcoa A152SG) slurries at doses of 0.1, 0.2, and 0.5 weight percent. The results of viscosity measurements are graphed in FIG. 3 as functions of the weight percent dosage, based upon the weight of the active ingredient. Similar data obtained for sample F in the experiment described in Example 9, is included in FIG. 3 for comparison.

Figure 3:
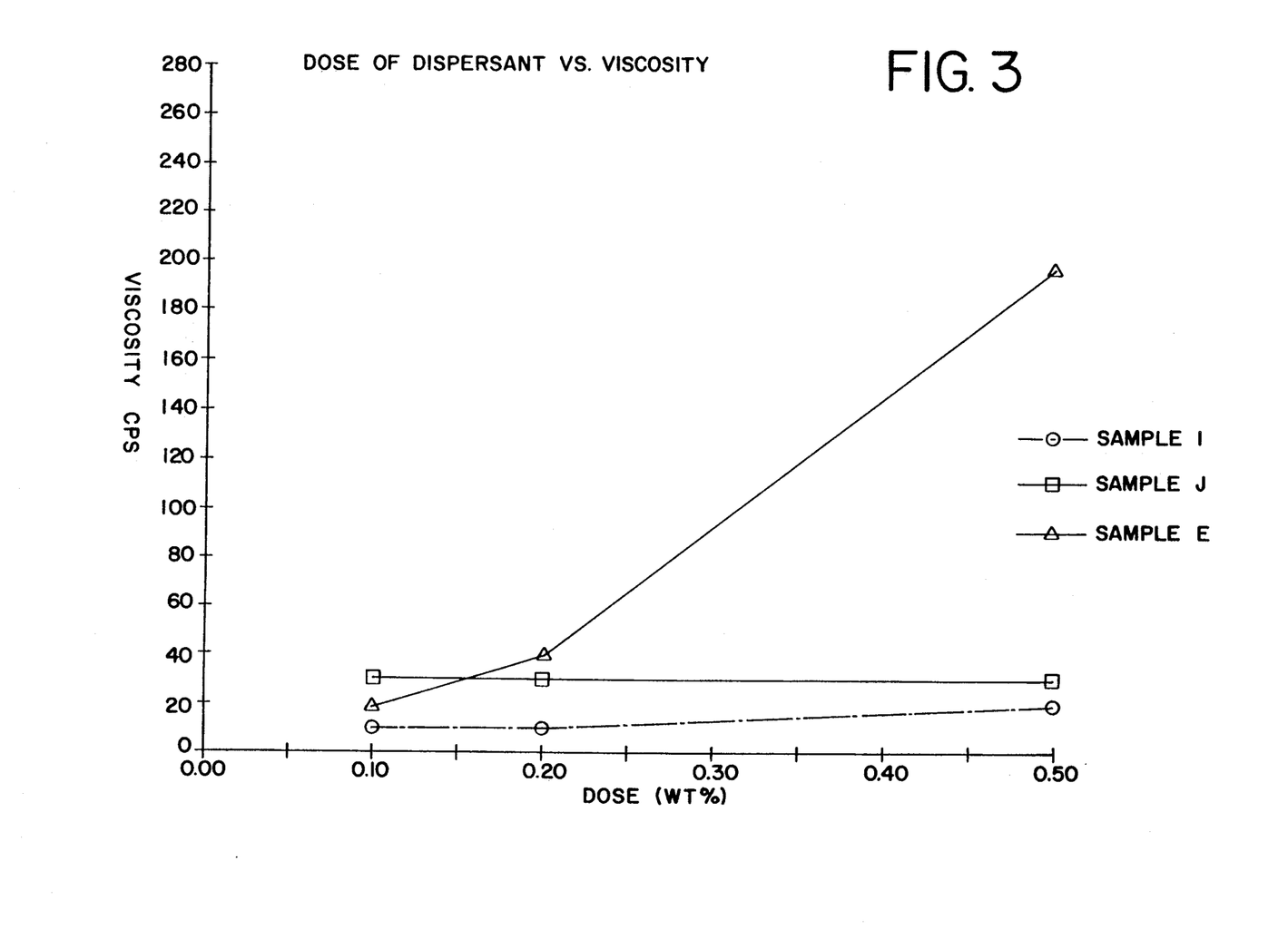
FIG. 3 is a graph which relates viscosity to the dosage of specified dispersants.

The data presented in FIG. 3 indicates that the dispersants designated sample I and sample J, which are salts of maleic acid anhydride and diisobutylene copolymers, produced comparable or superior reductions in alumina slurry viscosity as compared to the conventional dispersant sample F. These viscosities are insensitive to dose.

EXAMPLE 12

An experiment was conducted which demonstrates the performance of carboxylate-containing dispersants in spray drying and their effect on green ceramic properties. Two preferred carboxylate-containing dispersants were blended into slurries of alumina prepared according to the methods described above, spray-dried, and formed into compacted green samples. The purpose of this experiment was to determine whether the dispersants contributed to densification or green strength and to confirm the compatibility of the dispersants with the full process for preparing a ceramic material.

The dispersants were tested at 0.2, 0.5 and 1.0 weight percent, calculated as the ammonium salt and based on the dry weight of alumina. Control runs using aqueous ammonium polyacrylate, prepared as in Example 5 above, were conducted at the same doses. The slurries were dried by a Yamato DL-41 spray dryer having an inlet temperature of 250° C. The powders were equilibrated at 20% relative humidity and room temperature for three days before testing.

In the first part of the experiment, a carboxylate-containing terpolymer dispersant designated Sample K, prepared according to the method described in Example I above, was blended with a 50 volume percent alumina in water slurry at various doses. A control dispersant, prepared according to the method described in Example 5, was blended with an identical slurry at the same doses. All of the slurries were subsequently spray-dried. Spray-drying conditions for six spray-drying runs are set forth in TABLE I below:

TABLE I

| | dispersant dose (% by weight of active ingredient) | | | | | |
|---|---|---|---|---|---|---|
| | 0.2 | | 0.5 | | 1.0 | |
| Sample | K | Control | K | Control | K | Control |
| Viscosity at dryer (cP) | 250 | 400 | 150 | 700 | 25.0 | 400 |
| weight % alumina | 74.9 | 74.9 | 74.9 | 74.9 | 74.9 | 74.9 |
| yield of powder (%) | 73.4 | 79.8 | 70.6 | 56.8 | 67.4 | 71.9 |
| water in powder (%) | 0.95 | 0.89 | 0.87 | 0.89 | 0.34 | 0.50 |
| flow rate (g/sec) | 3.23 | 3.66 | 2.97 | 2.84 | 2.12 | 1.67 |
| apparent density (g/cm$^3$) | 1.35 | 1.33 | 1.32 | 1.34 | 1.19 | 1.16 |
| tap density (g/cm$^3$) | 1.54 | 1.55 | 1.53 | 1.60 | 1.42 | 1.38 |
| weight % −325 mesh | 11.4 | 11.3 | 9.9 | 13.1 | 8.1 | 11.9 |
| average particle diameter (μm) | 99 | 122 | 130 | 141 | 120 | 94 |

After spray drying, samples of the dried ceramic particles, all having the same type of binder, were compressed at 10, 15 or 20 kpsi to produce compacted green samples. Green strengths exhibited by the green samples are graphed as a function of corrected density in FIG. 4.

In the second part of the experiment, a carboxylate-containing terpolymer designated Sample L was prepared according to the method described in Example 7 above. Sample L was subsequently blended with deionized water, alumina, and a binder to produce a slurry containing 50 volume percent of alumina and spray-dried. Spray-drying conditions for slurries containing Sample L or, alternatively, a control dispersant prepared as in Example 5, are presented in Table II.

TABLE II

| | dispersant dose (% by weight of active ingredient) | | | | | |
|---|---|---|---|---|---|---|
| | 0.2 | | 0.5 | | 1.0 | |
| Sample | L | Control | L | Control | L | Control |
| Viscosity at dryer (Cp) | 470 | 480 | 670 | 1000 | 29 | 1000 |
| weight % alumina | 74.9 | 74.9 | 74.9 | 73.4 | 74.9 | 69.8 |
| water in powder (%) | 0.39 | 0.40 | 0.28 | 0.13 | 0.13 | 0.11 |
| flow rate (g/sec) | 3.79 | 3.69 | 4.42 | 3.98 | 2.38 | 2.10 |
| apparent density (g/cm$^3$) | 1.31 | 1.33 | 1.36 | 1.33 | 1.23 | 1.26 |
| tap density (g/cm$^3$) | 1.55 | 1.58 | 1.60 | 1.58 | 1.48 | 1.51 |
| weight % −325 mesh | 18.2 | 18.8 | 13.0 | 11.4 | 15.5 | 19.2 |
| average particle diameter (μm) | 87 | 100 | 99 | 89 | 82 | 71 |

Figure 4:
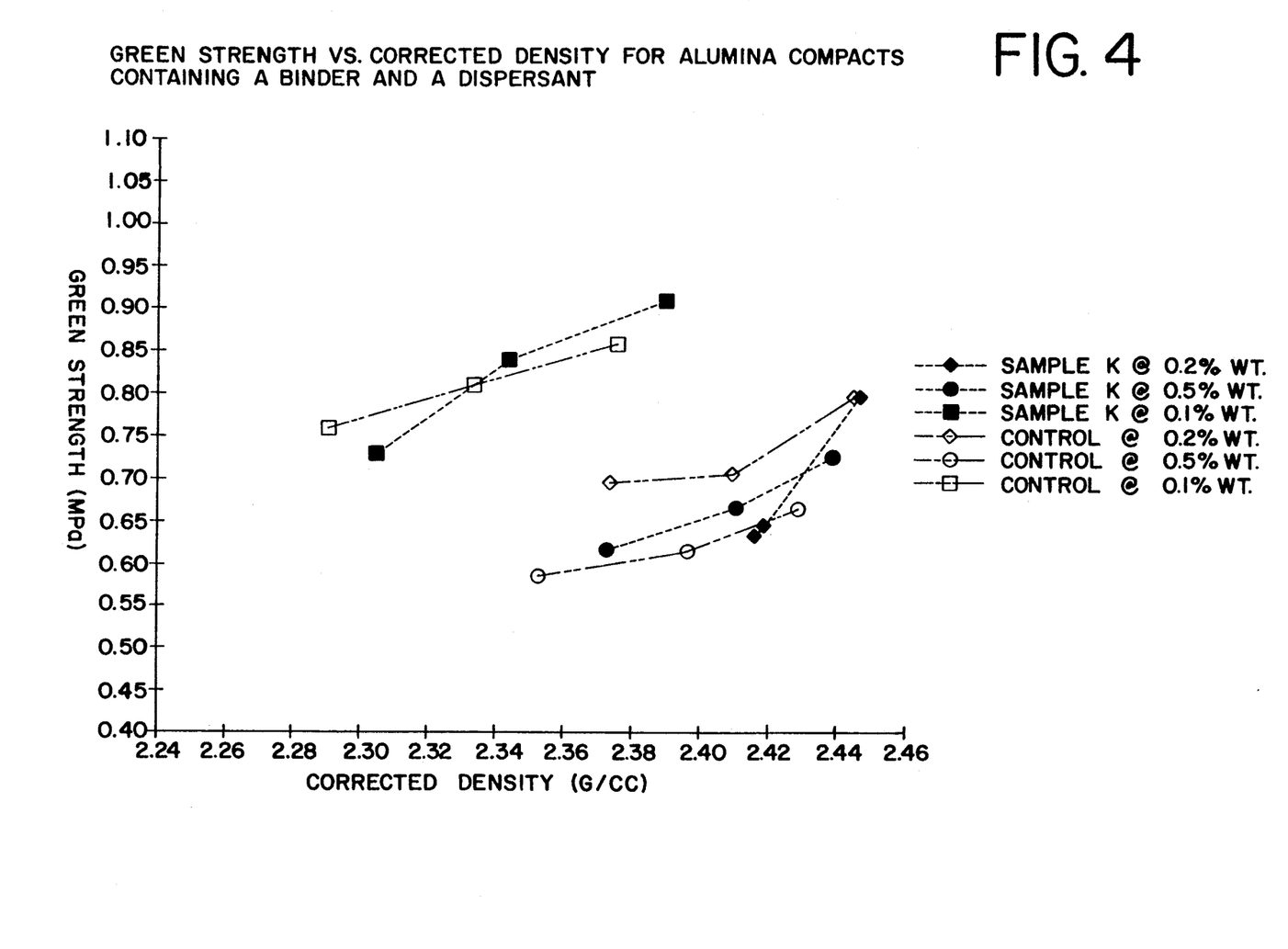
FIG. 4 is a graph of green strength as a function of corrected density for compacted green samples prepared with Sample K or a control as dispersant.
Figure 5:
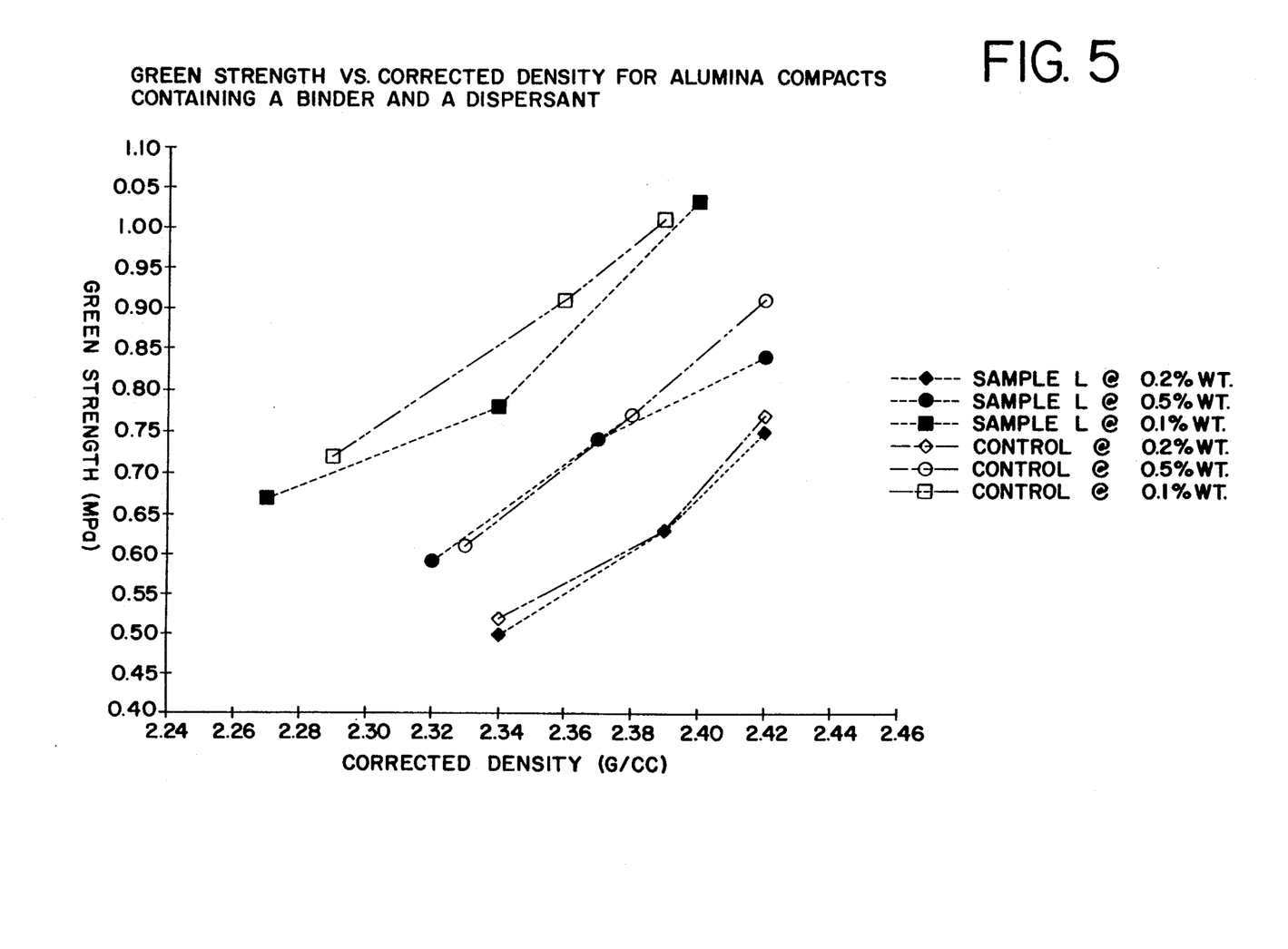
FIG. 5 is a graph of green strength versus corrected density for compacted green samples having Sample L or a control as dispersant.

FIG. 4 and FIG. 5 demonstrate that green strength is greater for ceramics having relatively larger doses of the dispersants. The increase in green strength for 0.2 weight percent compared as to 1.0 weight percent dispersant is on the order of 12 to 37%. The greater strengths correlate with a slight reduction in corrected green density.

What is claimed is:

1. A method for preparing a ceramic oxide material which comprises:
    mixing a ceramic oxide powder with an aqueous solution containing a salt of an anionic polymer produced by hydrolyzing a terpolymer of maleic anhydride, N-vinylpyrrolidinone, and a vinyl compound selected from the group consisting of acrylic acid, acrylamide, methyl methacrylate, and butyl vinyl ether to produce a slurry;
    spray drying the slurry to produce substantially dry particles which contain the salt of the anionic polymer;
    compressing the particles while substantially dry to produce an aggregate structure; and
    heating the aggregate structure to produce a fired ceramic material.

2. The method of claim 1 wherein the slurry includes in the range of about 40 volume percent to about 60 percent of the ceramic oxide powder, based upon the total volume of the slurry.

3. The method of claim 1 wherein the slurry includes in the range of about 0.01 to about 5 percent of the salt, based upon the total weight of the ceramic oxide powder.

4. A method for preparing a ceramic oxide material which comprises:
    mixing a ceramic oxide powder with an aqueous solution containing a salt of an anionic polymer produced by hydrolyzing a copolymer of vinyl acetate or an alkyl vinyl ether and a dicarbonyl compound selected from the group consisting of maleic acid, maleic acid anhydride, and fumaric acid to produce a slurry;
    spray drying the slurry to produce substantially dry particles which contain the salt of the anionic polymer;
    compressing the particles while substantially dry to produce an aggregate structure; and
    heating the aggregate structure to produce a fired ceramic material.

* * * * *